June 21, 1927.
C. C. DANIELS
1,633,437
VEGETABLE WASHING MACHINE
Filed Jan. 26, 1926
3 Sheets-Sheet 1
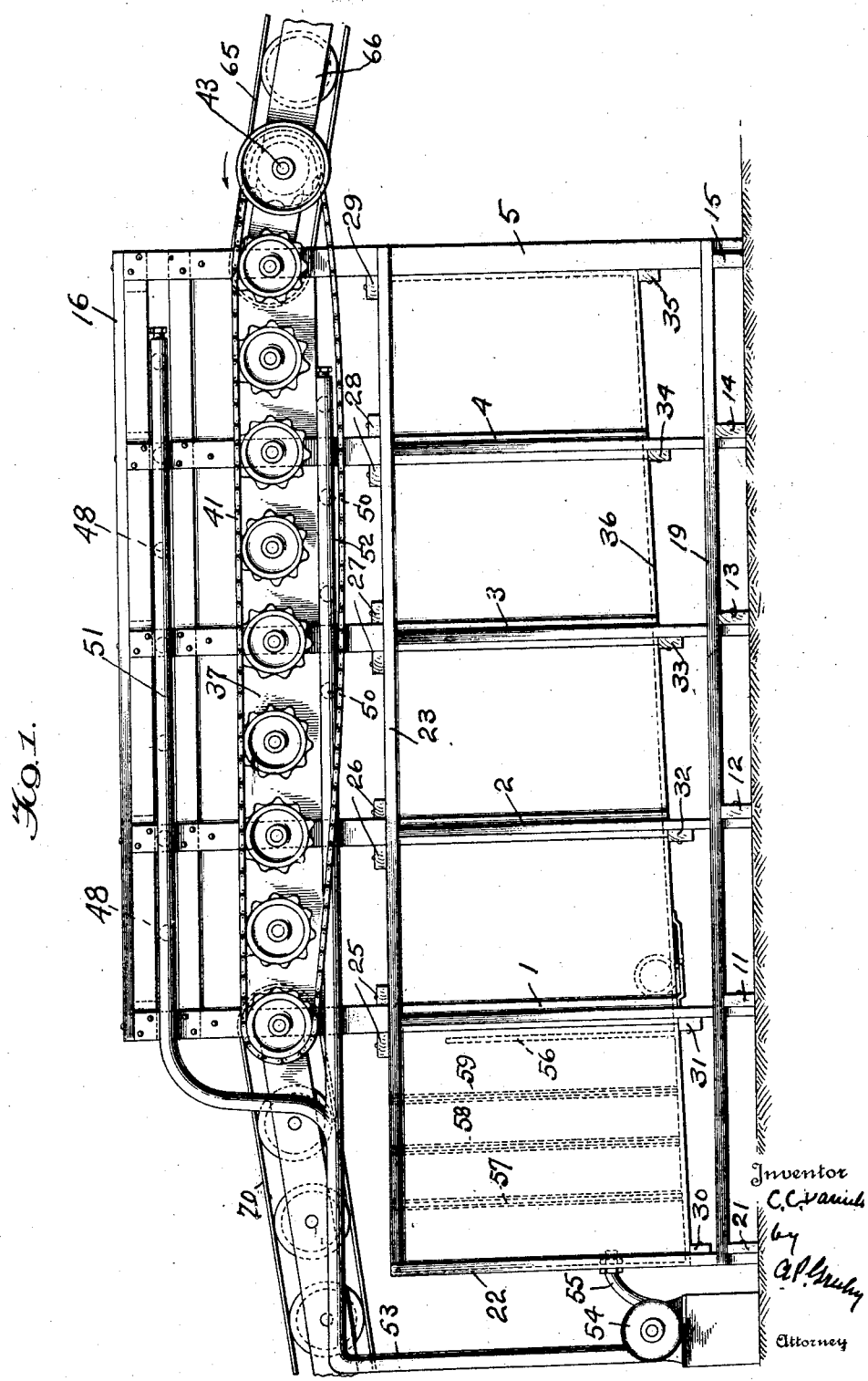

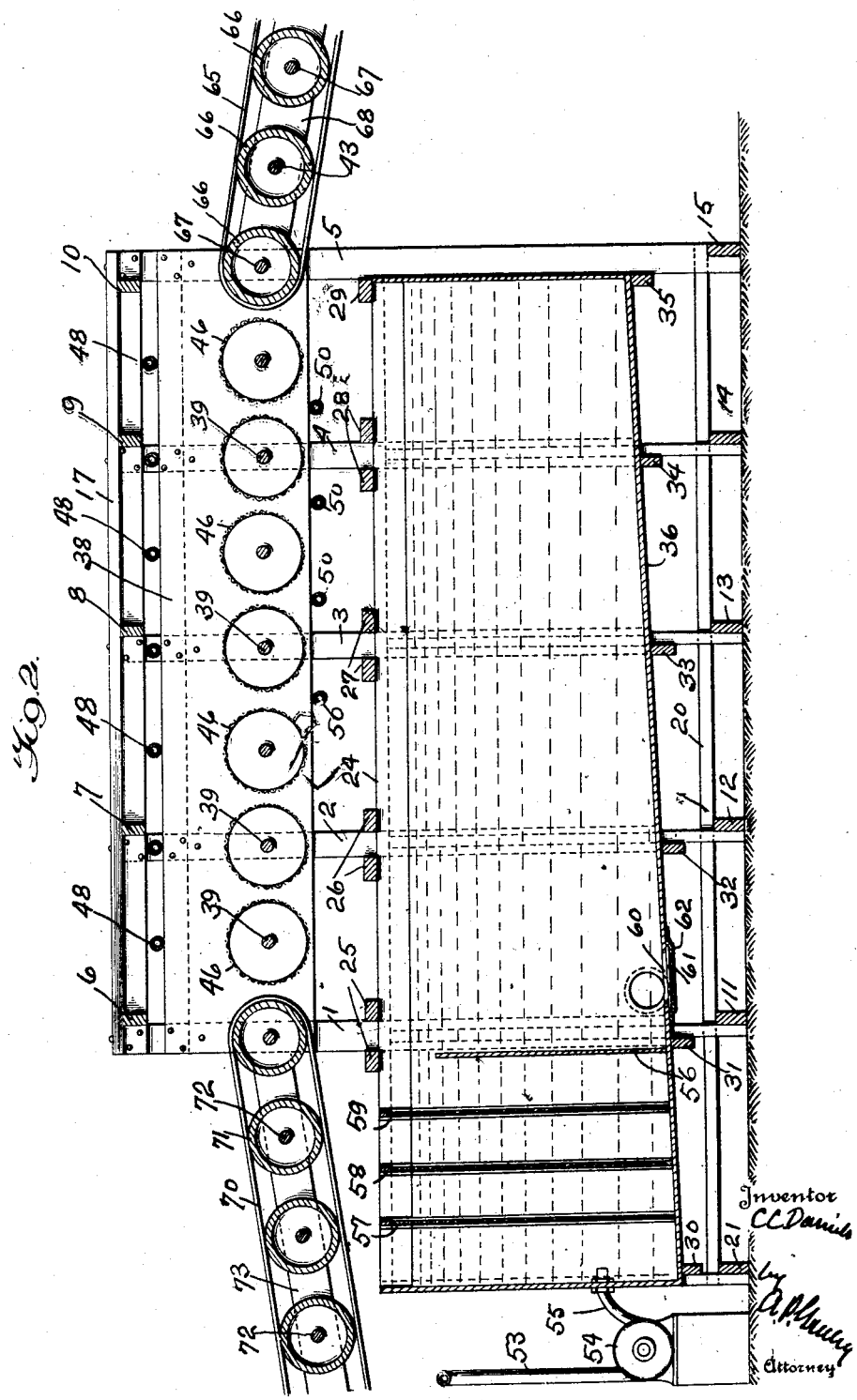

June 21, 1927.
C. C. DANIELS
1,633,437
VEGETABLE WASHING MACHINE
Filed Jan. 26, 1926
3 Sheets-Sheet 3
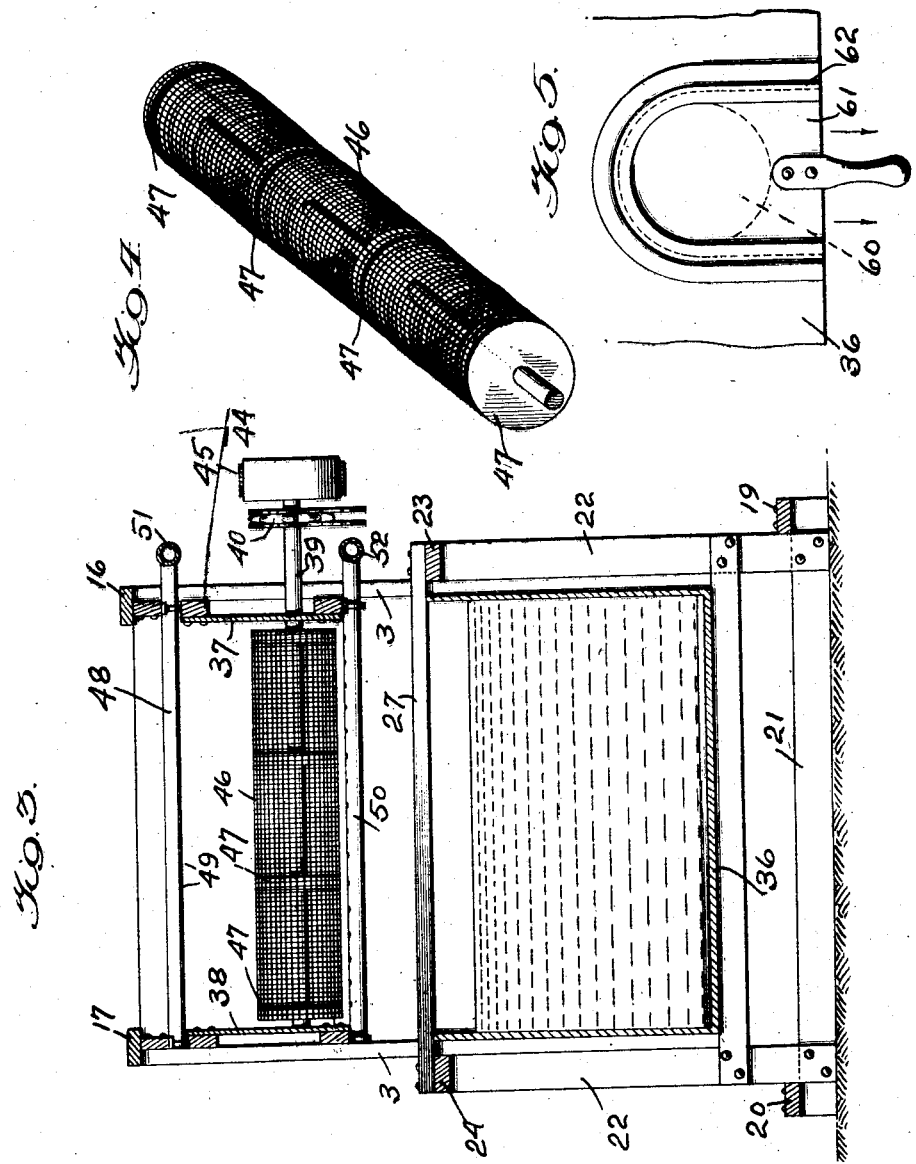

Patented June 21, 1927.

1,633,437

UNITED STATES PATENT OFFICE.

CECIL C. DANIELS, OF WESLACO, TEXAS, ASSIGNOR OF ONE-FOURTH TO F. W. STEPHENS AND ONE-FOURTH TO LUTHER HUGHES, BOTH OF WESLACO, TEXAS.

VEGETABLE-WASHING MACHINE.

Application filed January 26, 1926. Serial No. 83,926.

My invention relates to machines for cleaning vegetables and particularly adapted and intended to free roots such as beets, turnips, potatoes or other roots from the dirt which clings to them when dug or pulled from the ground.

My invention has for its object to provide a machine for the purpose stated which will be inexpensive in construction and operation and will effectively free the roots or other vegetables or other articles from adherent dirt without bruising or injuring them. A further object of the invention is to provide a machine which will operate upon vegetables either singly or in bunches to free them from adherent dirt.

With the object above set forth, and other objects hereinafter explained, in view, my invention consists in the construction and combination of elements hereinafter described and claimed.

Referring to the drawings:—

Figure 1 is a side view of a machine embodying my invention.

Figure 2 is a vertical, central, sectional view on line 2—2 of Figure 3.

Figure 3 is a cross sectional view on line 3—3 of Figure 1.

Figure 4 is a perspective view of one of the drums, and Figure 5 is a bottom plan view of the mud outlet.

In the drawings, 1, 2, 3, 4, and 5 indicate uprights arranged in pairs, the uprights of each pair being connected together at their upper ends by cross bars 6, 7, 8, 9, and 10, and at their lower ends by cross bars 11, 12, 13, 14, and 15. The uprights are connected at their upper ends by longitudinal strips 19 and 20, which rest on the cross bars 11, 12, 13, 14, and 15, these longitudinal strips 19 and 20 extending also rearward from cross bar 11 to rest at their ends on cross bar 21.

Short uprights 22, secured to cross bar, 21 and to the longitudinal strips 19 and 20, extend upward from the rear ends of strips 19 and 20.

About midway between the upper and lower ends of the uprights 1, 2, 3, 4, and 5, are longitudinal strips 23 and 24 secured to these uprights and extending rearward to the upper ends of the short uprights 22. Cross bars 25, 26, 27, and 28, arranged in pairs one on each side of one of the uprights, 1, 2, 3, and 4 and a single cross bar 29 on the rear side of upright 5, are secured at their ends to the longitudinal strips 23 and 24. There is thus formed a rigid frame for the machine.

To the uprights 22, 1, 2, 3, 4, and 5 are secured at suitable distances above the longitudinal strips 19 and 20, cross bars 30, 31, 32, 33, and 34, these being so arranged as to support the inclined bottom, 35, of a water tank, 36; the sides of which rest against the inner edges of the uprights, 1, 2, 3, and 4, with its ends against the uprights 22 and 5.

Secured to the inner faces of the uprights 1, 2, 3, 4, and 5 are longitudinal boards 37 and 38, in which are journalled a series of shafts, 39. These shafts carry on one end, outside the longitudinal board 37, a sprocket wheel, 40; the sprocket wheels of the several shafts, 39, being connected by sprocket chain 41, which is driven by sprocket wheel 42, on shaft 43, which also carries a pulley, 44, which is driven by a belt 45 from any convenient source of power.

On each side of the shafts 39, between the longitudinal boards 37 and 38, is carried a drum of wire netting 46, supported on discs 47, the netting being of relatively coarse mesh so as to permit sand and dirt to pass freely through it.

The shafts 39 are so spaced apart that these will be between the periphery of each drum and the next adjacent drum a substantial space not sufficient, however, to permit the articles being washed from falling through between the drums.

Above each drum and preferably parallel with its shaft is a water supply pipe 48, perforated as indicated at 49, to discharge water directly onto the drum below it. Below the line of the drums and in line with the space between them are water pipes 50, perforated on their upper faces so as to discharge streams of water upward into the spaces between adjacent drums.

The perforated water pipes 48, are connected at one end with a supply pipe 51, and the pipes 50 are connected at one end with supply pipe 52, the pipes 51 and 52 leading from a pipe 53, the end of which is connected to the discharge part of a pump 54, the inlet of which is connected by pipe 55 to the tank 36 at its lower end.

In the tank near the upright 1 is arranged a partition 56, extending up from the tank bottom nearly, but not quite, to the top and in the portion of the tank to the rear of the upright 1 are arranged vertical screens 57, 58, and 59, extending from the tank bottom to the level of its top.

At a point in its bottom near the partition 56, the tank 36 is provided with an outlet opening 60 of large diameter for the earthy matter which is washed off from the roots and sinks to the bottom of the tank. This outlet opening is normally closed by a valve 61, sliding in suitable ways 62, and provided with any convenient means such as handle 63, for operating it when necessary. 64 indicates end of a pipe for supplying water to the tank.

65 indicates a conveyer belt carried on rolls 66, on shafts 67, journalled in side strips 68, extending, preferably at a slight inclination to the horizontal, from the front end of the machine. This conveyer belt serves to carry the roots or other articles on to the drums 46.

At the discharge end of the machine over the portion of the tank which extends rearward from the uprights 1, is arranged a conveyer belt 70, for carrying the cleaned roots or other articles away from the drums 46. This conveyor belt is carried on rollers 71, on shafts 72, journalled in side strips 73, extending rearward from the uprights 1 and preferably inclined downward.

The number of drums 46, may be varied as desired and the conveyers which deliver the vegetables to, and carry them away from the drums, may be of any convenient construction.

In operation the roots or other vegetables, or other articles to be freed from adherent dirt are deposited on the conveyer at the front of the machine and are carried upward and deposited upon the first of the series of drums 46. As these are all rotated in the same direction the vegetables will be carried over by each drum and deposited upon the next drum with a slight impact which tends to loosen the adherent dirt. As the vegetables are carried over each drum it is subjected to the washing action of the jets from the perforations in pipes 48, and as the vegetables are passing from one drum to another they are subjected to the washing action of the upwardly directed jets from the pipes 50. Dirt which falls or is washed off from the vegetables falls with the streams of water from the perforated pipes through the meshes of the drums or through the spaces between adjacent drums, into the tank and settles toward the bottom of the tank. As the water in the tank reaches the level of the upper edge of the partition 56, it will overflow and pass into the part of the tank which is to the rear of the uprights 1. The water overflowing the top of the partition will be fairly clear from the heavier particles of dirt but may carry with it bits of leaf or dry vegetable material. Any such bits of floating material will be caught by the screens 57, 58, and 59, and practically clear water will be drawn by the inlet pipe 55 to be forced by the pump 54 through pipes 53 and 51 and 52, to the perforated pipes 48 and 50.

As the cleaned vegetables leave the last one of the drums 46, they will be carried away by the conveyer belt 70, to be packed for shipment either with or without preliminary drying.

The drums carry the vegetables forward and at the same time subject them to agitation sufficient to dislodge the dirt softened by the streams of water from the perforated pipes. And the drums being formed of netting, permit the particles of dirt so dislodged to be washed through them or between them by the streams of water from the perforated pipes.

It will be understood that the pump 54 will be run at such speed as to cause the water to be driven from the perforations of the pipes 48 and 50 with considerable force. The drums 46 may be of any diameter desired and may be spaced apart desired distance but they are preferably made of a diameter of six inches and are so spaced apart as to leave a space of about a half inch between the peripheries of adjacent drums. The speed of rotation given to the drums should be such as to give the vegetables substantial tumbling or agitation as the are carried forward, without such violence as would bruise or break the exterior surface.

While the drums 46, are preferably formed of wire netting as described, they may be formed of any sheet metal or other sheet material having openings through it adapted to permit free passage of the water and the dirt dislodged from the vegetables.

Having thus described my invention, what I claim is:—

1. In a machine for cleaning vegetables, a series of cylindrical drums formed of wire netting, having their axes parallel and in the same horizontal plane, and so arranged as to leave a substantial space between the peripheries of adjacent drums, means for rotating the drums, and means for forcing water upward between the peripheries of adjacent drums.

2. In a machine for cleaning vegetables, a series of cylindrical drums formed of wire netting, having their axes parallel and in the same horizontal plane, and so arranged as to leave a substantial space between the peripheries of adjacent drums, means for rotating the drums, means for supplying water to the drums from above, and means for forcing water upward between the peripheries of adjacent drums.

3. In a machine for cleaning vegetables, a series of cylindrical drums formed of wire netting, having their axes parallel and in the same horizontal plane, and so arranged as to leave a substantial space between the peripheries of adjacent drums, means for rotating the drums, a perforated pipe arranged above each drum for supplying water thereto from above, a perforated pipe below and in line with the space between adjacent drums for forcing water upward between them.

4. In a machine for cleaning vegetables, a series of cylindrical drums formed of wire netting, having their axes parallel and in the same horizontal plane, and so arranged as to leave a substantial space between the peripheries of adjacent drums, means for rotating drums, means for supplying water to drums from above, means for forcing water upward between the peripheries of adjacent drums, a tank below the drums to receive the water from them, having its bottom inclined rearward, a pump for drawing water from the tank and supplying it to the drums and a partition between the body of the tank and the inlet terminating below the top of the tank.

5. In a machine for cleaning vegetables, a series of cylindrical drums formed of wire netting, having their axes parallel and in the same horizontal plane, and so arranged as to leave a substantial space between the peripheries of adjacent drums, means for rotating drums, means for supplying water to the drums from above, means for forcing water upward between the peripheries of adjacent drums, a tank below the drums to receive the water from them, having its bottom inclined rearward, a pump for drawing water from the tank and supplying it to the drums, a partition between the body of the tank and the inlet terminating below the top of the tank and screens between the partition and the inlet for the pump.

6. In a machine for cleaning vegetables, a series of cylindrical drums formed of wire netting, having their axes parallel and in the same horizontal plane, and so arranged as to leave a substantial space between the peripheries of adjacent drums, means for rotating drums, means for supplying water to the drums from above, means for forcing water upward between the peripheries of adjacent drums, a tank below the drums to receive the water from them, having its bottom inclined rearward, a pump for drawing water from the tank and supplying it to the drums, a partition between the body of the tank and the inlet terminating below the top of the tank, and a valve controlled outlet in the body of the tank near the partition.

7. In a machine for cleaning vegetables, a series of cylindrical drums formed of wire netting, having their axes parallel and in the same horizontal plane, and so arranged as to leave a substantial space between the peripheries of adjacent drums, means for rotating drums, means for supplying water to the drums from above, means for forcing water upward between the peripheries of adjacent drums, a tank below the drums to receive the water from them, having its bottom inclined rearward, a pump for drawing the water from the tank and supplying it to the drums, a partition between the body of the tank and the inlet terminating below the top of the tank; screens between the partition and the inlet for the pump and a valve controlled outlet in the body of the tank near the partition.

In testimony whereof, I hereunto affix my signature.

CECIL C. DANIELS.